United States Patent [19]
Paynton et al.

[11] Patent Number: 4,779,025
[45] Date of Patent: Oct. 18, 1988

[54] COMPUTER TOUCH PANEL FILTER

[75] Inventors: Richard D. Paynton; Richard D. Paynton, Jr., both of Doylestown, Pa.

[73] Assignee: Dontech Incorporated, Doylestown, Pa.

[21] Appl. No.: 17,245

[22] Filed: Feb. 20, 1987

[51] Int. Cl.⁴ .................................... H04M 5/65
[52] U.S. Cl. .................................... 313/478; 358/247; 340/712
[58] Field of Search ............... 313/478, 479; 358/247, 358/252; 340/712; 174/35 GC, 35 MS

[56] References Cited

U.S. PATENT DOCUMENTS 4,514,585  4/1985  Paynton .................... 174/35 GC
4,692,809  9/1987  Beining et al. ............. 358/247

Primary Examiner—David K. Moore
Assistant Examiner—K. Wieder
Attorney, Agent, or Firm—Howson and Howson

[57] ABSTRACT

A computer touch panel filter assembly that absorbs and grounds radiation induced currents. The panel assembly is used in combination with a computer screen having light beams that intersect in front of touchable regions to provide an indication of the location touched when the light beams are interrupted.

7 Claims, 2 Drawing Sheets

COMPUTER TOUCH PANEL FILTER

FIELD OF THE INVENTION

The present invention relates to radiation shielded computer terminals, and more particularly, the present invention relates to radiation shields for computer terminals having so-called touch panels which display information at particular locations and which, when touched at a particular location, provide a computer input function.

BACKGROUND OF THE INVENTION

In recent years, there has been increasing emphasis on shielding computer information display devices, such as cathode ray tube (CRT) screens both to prevent certain types of ambient electromagnetic interference or radiation from penetrating the screen and to prevent certain types of electromagnetic interference or radiation from exiting the screen while permitting information on the screen to be readily viewed by a computer operator. Generally, such shields, or filters, have taken the form of conductive metal meshes laminated between glass and/or plastic panels disposed across the front of the screen and appropriately grounded to the cabinet in which the screen is mounted.

An improved CRT screen filter of this general nature is disclosed in U.S. Pat. No. 4,514,585 entitled "Filter and Method of Manufacturing" issued to one of the applicants herein. In the patented filter, an impregnated conductive metal mesh is bonded to and forms a surface of a plastic panel which is disposed across the front of the cathode ray tube and grounded peripherally to the cabinet in which the tube is mounted. The filter absorbs various types of radiation generated by the cathode ray tube and prevents various types of radiation from penetrating the cathode ray tube.

There are available computer terminals having so-called touch panels extending across the front of the computer information display screen for displaying separate regions, or menu blocks, of printed information, or indicia, within an area thereof. The touch panels are associated with various means for producing a computer-responsive signal depending upon which of the separate regions is touched by an object, such as a pointer, finger or the like. The signal operates in conjunction with conventional computer circuitry to perform various well-known computer related input functions.

Various means are utilized to determine which information block is touched. One such means includes a series of light beams which intersect in a grid-like pattern in front of the screen in registry with the various information blocks. The aforementioned computer-responsive signal is produced when the intersecting light beams are interrupted, such as when the computer operator's finger is positioned on one of the information blocks. The light beams are generally provided by light emitters and are received by light detectors both of which are located in front of the screen and are arranged in spaced relation to provide the grid-like pattern of parallel intersecting beams of light, as well known in the art.

The aforedescribed type of computer terminal touch panels have presented problems when it comes to radiation and interference shielding. For instance, the light emitters and detectors are located laterally of the screen and so are not shielded by conventional filters as described above. Moreover, the emitter and detector pairs are known to be highly sensitive to stray radiation, generated internally of the screen and externally thereof, but it is difficult adequately to shield the same because of the need to project light beams over a range of wavelengths of sufficient intensity as to provide satisfactory location sensing performance under a wide range of ambient lighting conditions. Accordingly, there is not currently available commercially satisfactory means for shielding a computer terminal having such touch panels.

OBJECTS OF THE INVENTION

With the foregoing in mind, a primary object of the present invention is to provide a novel shielded touch panel assembly for an input device such as a computer terminal.

Another object of the present invention is to provide an effective shielded computer terminal touch panel assembly which is capable of being manufactured efficiently using known production techniques.

As a further object, the present invention provides a unique filter assembly for use in combination with a computer terminal of the type having a touch panel utilizing intersecting light beams to activate the computer.

Yet another object of the present invention is to provide a computer input screen shield capable of protecting light emitters and detectors associated therewith from interference generated internally and externally of the screen with which it is associated.

SUMMARY OF THE INVENTION

More specifically, the present invention provides a shielded touch panel assembly for use in combination with a computer terminal having intersecting light beams providing touch location sensing in front of its screen. The panel assembly includes a translucent shield panel disposed across the front of the cathode ray tube between the screen and the light emitters and detectors which provide the light beams that intersect in registry with separate information containing regions in a display area on the screen. The shield panel has a surface in which is embedded an electrically conductive mesh that extends beyond the area of information display. The shield panel is spaced rearwardly with respect to grounded conductive means, such as a metal face plate, provided on the cabinet in front of the intersecting light beams. A translucent frame surrounds the information display area, and the light emitters and detectors are arranged about the periphery of the frame. The frame has a peripheral side surface in which is embedded an electrically conductive mesh. The frame mesh is electrically coupled to the electrically conductive mesh of the shield panel and to the cabinet face plate grounding means via conductive means interposed therebetween. Preferably, the mesh is provided in the front surface of the panel, and the cabinet grounding means and shield panel mesh extend laterally of the screen to provide a recess in which the light emitters and detectors are mounted and thereby protected. Electrical currents induced by electromagnetic interference or radiation traversing the shielded touch panel assembly are thereby grounded to the computer terminal cabinet.

BRIEF DESCRIPTION OF THE DRAWINGS

The foregoing and other objects, features and advantages of the present invention should become apparent from the following description when taken in conjunction with the accompanying drawings, in which.

DESCRIPTION OF THE PREFERRED EMBODIMENTS

Figure 1:
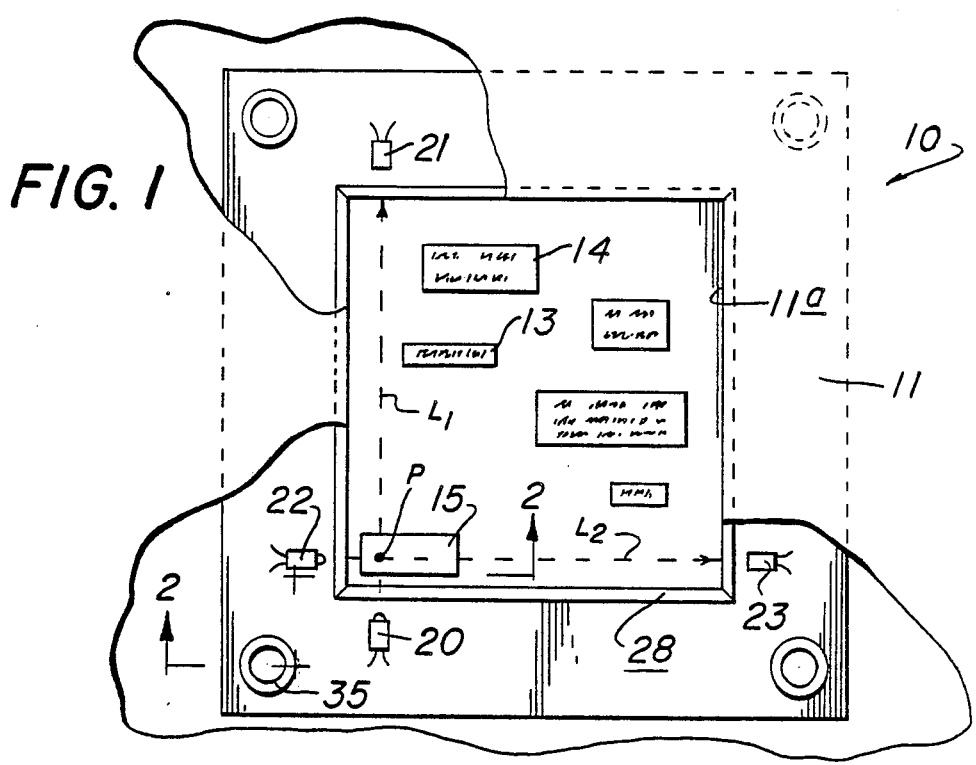
FIG. 1 is a front elevational view of a portion of a computer terminal having a shielded touch panel assembly embodying the present invention.

Referring now to the drawings, FIG. 1 illustrates a portion of a computer terminal 10 which incorporates a touch panel filter assembly 25 embodying the present invention. The computer terminal 10 includes a cabinet having a metal face plate 11 behind which is mounted a computer information display device, such as a conventional cathode ray tube (CRT) having a screen 12, illustrated fragmentally in FIG. 2. The cabinet face plate 11 has an aperture, such as the square aperture 11a, permitting information displayed on the CRT screen 12 to be viewed by a computer operator at the front of the terminal 10. The CRT screen 12 is adapted to display indicia, or information, in separate regions, or menu blocks, such as the regions 13, 14 and 15 contained within a display area within the aperture 11a.

As well known in the art, the blocks of information, such as the menu block 15 displayed on the CRT screen 12, contain information pertaining to computer input commands. When a touch panel is associated with the CRT screen 12 and a block touched, a computer command signal is generated, depending upon which information block is touched. For instance, the information block 15 may correspond to a computer input function which, when touched, causes a particular menu to be displayed on the CRT screen 12.

In order to determine the information block which has been touched, it is known to provide a gridwork of parallel light beams which are arranged either in a plane parallel to the screen 12, or spaced forwardly of the arc of the screen if curved. The light beams intersect in registry with the various information regions with the light beam intersection coordinates being arranged appropriately with respect to the information blocks.

Figure 2:
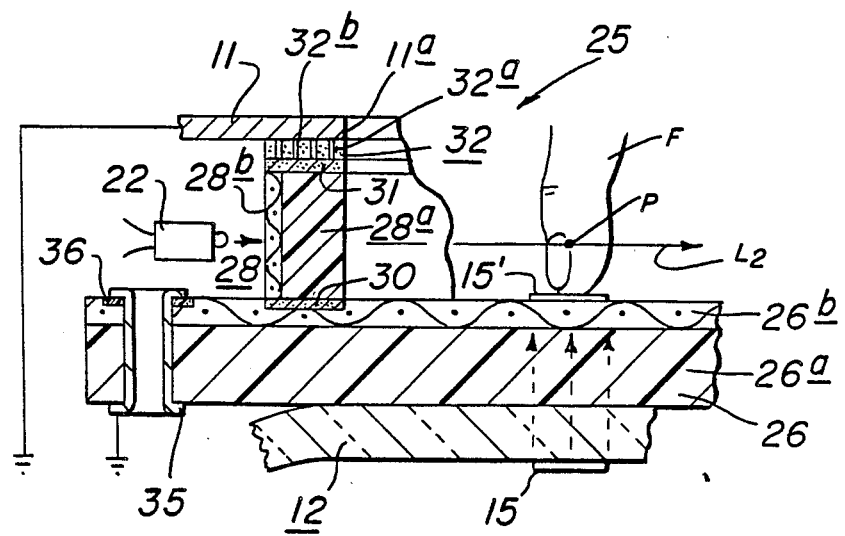
FIG. 2 is a greatly enlarged transverse sectional view of a portion of the shielded touch panel assembly illustrated in FIG. 1 and taken on irregular line 2—2 thereof.

To this end, a series of light emitter and detector pairs are arranged in spaced relation with respect to the information displaying area of the screen 12. For instance, as best seen in FIG. 1, the vertical light beam $L_1$ is produced by an emitter 20 located below the information block 15 and is received by a detector 21 located vertically thereabove. A horizontal light beam $L_2$ is produced by an emitter 22 and is received by a detector 23 spaced horizontally therefrom. The light beams $L_1$ and $L_2$ intersect at a point P located in front of the information block 15. As best seen in FIG. 2, when an optically opaque object, such as an operator's finger F, is positioned in registry with the information block 15, the light beams $L_1$ and $L_2$ are interrupted, thereby causing an appropriate input signal to be generated. Other light emitter and detector pairs (not shown) are similarly arranged with respect to the other information blocks, such as the blocks 13 and 14, to provide the desired grid pattern and they function in the same manner to produce appropriate computer input commands.

The computer touch panel structure described thus far is conventional. While it performs satisfactorily for its intended purpose, it has certain limitations. For one thing, it is not shielded. As a result, certain types of radiation can both escape from the computer terminal cabinet 11 and penetrate the same. While a filter, such as disclosed in aforementioned U.S. Pat. No. 4,514,585, can be installed across the CRT screen, such filter does not protect the light emitters and detectors from radiation.

The touch panel filter assembly 25 of the present invention overcomes these limitations. To this end, as best seen in FIG. 2, the touch panel filter assembly 25 comprises a touch panel 26 which includes a translucent, preferably transparent, plastic substrate 26a on which is laminated a metal mesh 26b. The metal mesh 26b is impregnated with a bonding agent and cooperates therewith to form the outer surface of the shield panel 26. Preferably, the shield panel 26 is manufactured in accordance with the teachings of aforementioned U.S. Pat. No. 4,514,585 entitled "Filter and Method of Manufacturing", the disclosure of which is incorporated by reference herein.

The shield panel 26 extends across the front of the cathode ray tube screen 12 and may be engaged therewith as illustrated in FIG. 2, or may be spaced therefrom. The shield panel 26 is translucent so that when mounted across the front of the information display screen 12 as illustrated in FIG. 2, the information block 15 on the screen 12 is transmitted through the panel 26 and displayed on the outer, or front surface, thereof, such as indicated at 15' in FIG. 2. Thus, when the information block 15' is touched, as by an operator's finger F, the light beams $L_1$, $L_2$ are interrupted at their intersection P.

To protect the light emitters and detectors 20-23 from stray electromagnetic interference and radiation, the touch panel assembly 25 includes a frame 28 which surrounds the display area containing the information blocks 13-15. The frame 28 is interposed between complementary pairs of light emitters and detectors, as illustrated in FIG. 1. In the illustrated embodiment, the frame 28 has a configuration corresponding to the configuration of the aperture 11a in the computer terminal cabinet face plate 11 which, in the present instance, is square. The frame 28 continuously surrounds the information display area of the CRT screen 12 and extends between the shield panel 26 and the computer terminal cabinet face plate 11 which is located forwardly of the shield panel 26 in front of the CRT screen 12. The cabinet face plate 11 is grounded electrically, as illustrated schematically in FIG. 2. The frame 28 is like in construction to the shield panel 26, and includes a plastic substrate 28a onto which is bonded an impregnated metal mesh 28b, as described heretofore. Preferably, the metal mesh 28b of the frame 28 is disposed toward the outside of the frame 28 in spaced confronting relation with the light emitters and detectors.

The frame 28 is electrically grounded to the CRT cabinet. For this purpose, the metal mesh surface 26b of the shield panel 26 is provided with a recess congruent with the shape of the frame 28, and an electrically conductive adhesive 30 is contained in the recess, both to provide electrical communication between the mesh 26b of the touch panel 26 and the mesh 28b of the frame 28, and to bond the inner edge of the frame substrate 28a to the shield panel 26. A like layer of electrically conductive adhesive 31 is provided on the outer, or front, edge of the frame 28 in electrical communication with the frame mesh 28b. A resiliently compressible gasket 32 of conventional construction, preferably comprising a plurality of fine wires 32a embedded within an elastomeric matrix 32b, is interpsed between the conductive adhesive 31 and the rear surface of the computer terminal cabinet face plate 11 with the wires engaging endwise therebetween to provide electrical communication therebetween. Preferably, both the metal mesh surface 26b of the shield panel 26 and the computer terminal cabinet face plate 11 extend beyond the frame 28 in spaced parallel relation to provide a recess about the periphery of the frame 28 for containing the light emitters and detectors therewithin. Preferably, the shield panel 26 is secured in the computer terminal cabinet by bolts passing through peripherally located grounded grommets, such as the grommet 35 in FIG. 2, which is electrically coupled to the shield panel mesh 26b as by an annular layer of electrically conductive adhesive 36 provided in a circular recess surrounding the grommet 35. If desired, however, other shield grounding means may be utilized, including a peripheral bus bar, wire, or the like.

In operation, with the computer terminal turned on, information appearing in the block 15 on the display screen 12 is transmitted through the shield panel 26 and appears at 15' on the front surface 26b thereof. Simultaneously therewith, the light beams $L_1$, $L_2$, produced by the light emitters 20, 22 intersect at the point P in front of the panel 26 as illustrated in FIGS. 1 and 2. When an operator places an object, such as a finger F on the information block 15' (which is in registry with the point P where the light beams intersect) the light beams are interrupted. This causes the detectors 21 and 23 to cooperate with appropriate computer circuitry to provide a computer command function which is indicative of the location touched. The computer then functions in a well known manner to perform the thus selected function displayed in the information block 15', as well known in the art.

While functioning in the above-described manner, electromagnetic radiation emitted from the screen 12 passes across the metal mesh 26b of the shield panel 26 and generates electrical currents therein. These currents are conducted laterally through the mesh 26b and to the metal face plate 11 of the cabinet via the frame mesh 28b and its electrically conductive connections 30, 31 and 32 between the shield panel 26 and the cabinet face plate 11. Additionally, currents are also conducted to ground via the grounded grommet 35 should such be used to mount the touch panel assembly 25 within the cabinet. In addition to grounding radiation emitted from the screen 12, the frame 28 of the aforedescribed touch panel filter assembly 25 absorbs ambient electromagnetic radiation and conducts the same to ground, thereby protecting the light emitters and detectors.

Figure 3:
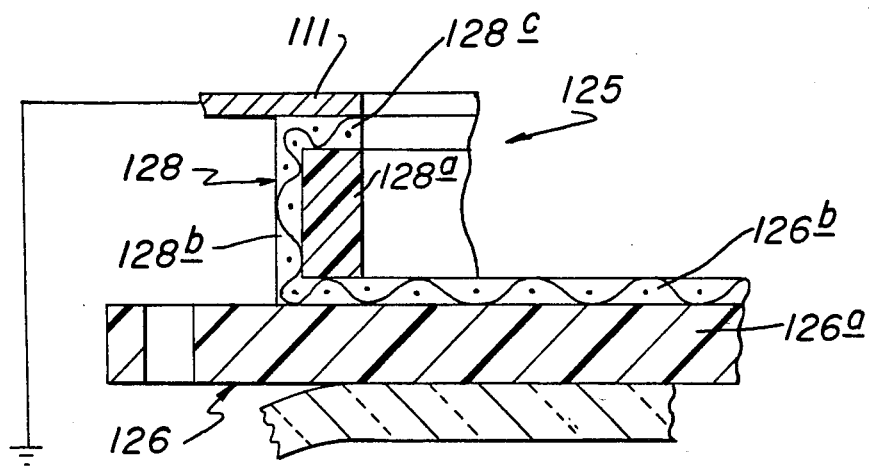
FIG. 3 is a view, similar to FIG. 2, but illustrating a modified embodiment of the present invention.

If desired, a modified embodiment of the filter panel assembly 25 may be provided. As best seen in FIG. 3, in the modified filter panel assembly 125, the shield panel 126 is of like construction to the touch panel 26, including a clear plastic substrate 126a and a bonded metal mesh upper surface 126b. In this embodiment, during fabrication, the metal mesh 126b has a peripheral marginal portion 128b which is initially left unbonded so that it extends laterally of the frame 128. After the frame 128 is mounted on the shield panel 126 the mesh margin 128b is bent upwardly along the outer peripheral surface of the frame substrate 128a and bonded thereto in much the same manner in which the shield panel 126 is fabricated. Thereafter, the metal mesh margin is bent inwardly and interposed and compressed without bonding between the outer edge of the frame 128 and the inner surface of the cabinet face plate 111 in the manner illustrated at 128c in FIG. 3. Thus, a continuous electrical current path of metal mesh is provided for conducting to ground radiation induced currents passing across either the shield panel or the frame, or both. It is noted that in this embodiment, the shield panel 126 is mounted in the cabinet simply by bolting the same in place without using a conductive grommet such as illustrated in FIGS. 1 and 2. While this construction has certain advantages, it does not protect the light emitters and detectors in as complete a manner as the structure illustrated in FIGS. 1 and 2.

In the illustrated embodiments, the metal mesh is embedded in the front surface or side of the panel. If desired, the mesh may be embedded in the side facing the screen, and the mesh of the frame may likewise be embedded in the surface or side opposite the side illustrated. The construction illustrated is preferred because it is easier to manufacture and thereby affords certain advantages.

In view of the foregoing, it should be apparent that the present invention now provides a touch panel filter assembly which protects sensitive electronic components from damage due to stray electromagnetic interference and radiation. The touch panel assembly is relatively simple in construction yet straightforward to manufacture. The touch panel filter assembly of the present invention is highly desirable for use in those application wherein stray electromagnetic radiation shielding is required for computer terminals having intersecting light beams providing touch location sensing.

While preferred embodiments of the present invention have been described in detail, various modifications, alterations and changes may be made without departing from the spirit and scope of the present invention as defined in the appended claims.

We claim:

1. For use in combination with a touchable means displaying indicia at predetermined locations in an area located in front of a display screen mounted in a cabinet having electrical grounding means surrounding said area and spaced apart light emitters and detectors providing intersecting light beams extending across said touchable means and adapted to be interrupted by an object positioned in registry with a selected indicia on the touchable means to provide indicia location sensing, the improvement comprising: means for shielding said screen and said light emitters and detectors against electromagnetic radiation, including a translucent shield panel disposed across the front of said screen, said shield panel having a surface in which is embedded an electrically conductive mesh that is at least coextensive with said touchable area, a translucent frame means surrounding said touchable area and interposed between said light emitters and detectors, said frame having a peripheral side surface in which is embedded an electrically conductive mesh, said frame also having opposed end surfaces an inner one of which confronts said shield panel and an outer one of which confronts said cabinet grounding means, conductive means providing electrical communication between said shield panel mesh and said grounding means via said frame means mesh, said shield panel surface faces away from said display screen and has a front recess congruent with said inner edge of said frame means to expose said conductive mesh therein, and said conductive means includes a layer of conductive material in said recess electrically coupling the conductive shield panel mesh to the frame mesh at said inner edge thereof, and a resilient conductive gasket engaged between said cabinet grounding means and the outer edge of the frame means for providing said electrical communication between said cabinet grounding means and said conductive shield panel mesh, whereby electrical currents induced by electromagnetic radiation passing the shield panel and frame are grounded.

2. A shielded touch panel assembly comprising:
a touchable panel having a first electrically conductive means bonded to a surface over a predetermined area of a first translucent substrate, said touchable panel adapted to be disposed across the front of a display screen which is capable of displaying separate regions of indicia within said predetermined area,
a frame surrounding said area in forwardly spaced relation with said panel, said frame having a second electrically conductive means bonded to an outer peripheral surface and opposed inner and outer edge surfaces of a second translucent substrate, said second means on said inner edge surface being bonded to said panel and electrically connected to said first means, for permitting light beams to be passed through said frame and to intersect in said regions of indicia in front of said panel, and
a faceplate surrounding said predetermined area in forward spaced relation to said panel and compressing against said second means on said outer edge surface of said second substrate, said faceplate being electrically connected to ground,
whereby electrical currents induced by electromagnetic radiation traversing said panel and said frame are grounded.

3. Apparatus according to claim 2 wherein both said first conductive means of said touchable panel and said faceplate extend laterally outward in spaced relation from said frame for providing therebetween a recess adapted to contain therebetween light emitters and detectors and thereby to protect the same against electromagnetic radiation.

4. Apparatus according to claim 3 wherein said frame is of like construction to said touchable panel and has a second conductive means embedded in said outer peripheral surface thereof.

5. A shielded touch panel assembly comprising:
a plastic touchable panel having an electrically conductive mesh forming a surface over a predetermined area thereof, said touchable panel adapted to be disposed across the front of a display device which is capable of displaying separate regions of indicia within said predetermined area,
grounding means surrounding said predetermined area in forwardly spaced relation with said touchable panel,
translucent and electrically conductive frame means surrounding said touchable panel area between said panel surface and said grounding means for permitting light beams to be passed through said frame means and to intersect in said regions of indicia in front of said panel,
conductive means electrically connecting said frame means between said grounding means and said conductive mesh of said touchable panel,
said conductive mesh of said touchable panel and said grouding means extending laterally outward in spaced relation from said frame means for providing therebetween a recess adapted to contain therebetween light emitters and detectors and thereby to protect the same against electromagnetic radiation,
said frame means is of like construction to said touchable panel means and has a conductive mesh embedded in the outer peripheral surface thereof, and
said conductive means includes a resiliently compressible conductive gasket engaged between said grounding means and said frame means and in electrical communication with the conductive mesh thereof,
whereby electrical currents induced by electromagnetic radiation traversing the touchable panel and frame means are grounded.

6. Apparatus according to claim 4 wherein said second conductive mesh is intergral with said first conductive mesh.

7. Apparatus according to claim 4 wherein said second conductive means includes a resiliently compressible electrically conductive gasket engaged between said faceplate and said frame for electrical communication with said first conductive means.

* * * * *